United States Patent
Tan et al.

(10) Patent No.: US 11,755,450 B1
(45) Date of Patent: Sep. 12, 2023

(54) SYSTEMS AND METHODS FOR DETECTING AND SUGGESTING BREAKS FROM USE OF AN IHS (INFORMATION HANDLING SYSTEM)

(71) Applicant: Dell Products, L.P., Round Rock, TX (US)

(72) Inventors: Loo Shing Tan, Singapore (SG); Seng Khoon Teh, Singapore (SG); Ruizhi Joyce Lu, Singapore (SG); Chau Pham Ngoc Minh, Singapore (SG); Vera Venkata Satyanarayana Chowdary Parimi, Singapore (SG)

(73) Assignee: Dell Products, L.P., Round Rock, TX (US)

( * ) Notice: Subject to any disclaimer, the term of this patent is extended or adjusted under 35 U.S.C. 154(b) by 72 days.

(21) Appl. No.: 17/651,660

(22) Filed: Feb. 18, 2022

(51) Int. Cl.
*H04L 67/50* (2022.01)
*G06F 11/34* (2006.01)
*G06F 11/30* (2006.01)
*H04L 69/28* (2022.01)

(52) U.S. Cl.
CPC ...... *G06F 11/3438* (2013.01); *G06F 11/3041* (2013.01); *G06F 11/3051* (2013.01); *G06F 11/3058* (2013.01); *H04L 69/28* (2013.01)

(58) Field of Classification Search
CPC .......................... H04L 67/535; G06F 11/3438
See application file for complete search history.

(56) References Cited

U.S. PATENT DOCUMENTS

| | | | |
|---|---|---|---|
| 8,488,769 B1* | 7/2013 | Noble, Jr. | H04M 3/5175 379/265.03 |
| 9,785,534 B1* | 10/2017 | Paulus | G06F 11/3041 |
| 11,550,690 B1* | 1/2023 | Basu | G06F 3/0484 |
| 2017/0000348 A1* | 1/2017 | Karsten | G06Q 10/1093 |
| 2017/0235407 A1* | 8/2017 | Li | G06F 11/3438 345/173 |
| 2018/0081496 A1* | 3/2018 | Bhardwaj | G06F 3/011 |
| 2019/0373432 A1* | 12/2019 | Gabriele | H04W 52/0245 |
| 2023/0178206 A1* | 6/2023 | Pino | G16H 50/30 600/545 |

FOREIGN PATENT DOCUMENTS

DE 102013221867 B4 * 9/2022 ............ B60K 37/06

* cited by examiner

*Primary Examiner* — Kostas J Katsikis
(74) *Attorney, Agent, or Firm* — Fogarty LLP (57) ABSTRACT

System and methods are provided for detecting and suggesting breaks in activity by a user of an Information Handling System (IHS). I/O operations by the user of the IHS are monitored, without use of a camera and thus within privacy restrictions. Upon initiating the activity monitoring, a timer is initialized. Using the timer, intervals are identified with no activity by the user, thus indicating the user has taken a break from operating the IHS. Based on the monitored user activity, intervals are also identified with uninterrupted operation of the IHS by the user, such as monitored activity by the user without identifying an interval of inactivity that indicates the user has taken a break. Upon detection of an interval with uninterrupted operation of the IHS, the user is presented with a suggestion to take a break from operation of the IHS.

20 Claims, 3 Drawing Sheets

SYSTEMS AND METHODS FOR DETECTING AND SUGGESTING BREAKS FROM USE OF AN IHS (INFORMATION HANDLING SYSTEM)

FIELD

This disclosure relates generally to Information Handling Systems (IHSs), and more specifically, to managing use of IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs that are utilized for personal use, such personal computers, laptops, tablets, smartphones, etc., are increasingly likely to be utilized for long periods of time on a regular basis. Uninterrupted use of IHSs without breaks has been demonstrated to be potentially harmful, both physical and psychologically, to the user. In some instances, long intervals of uninterrupted use of an IHS may be intentional, such as in gameplay. However, in many instances, long intervals of uninterrupted use of an IHS may be through lack of awareness (i.e., losing track of time) by the user, and may thus be unintentional. In either case, taking regular breaks from prolonged use of an IHS is beneficial to the user.

SUMMARY

In various embodiments, Information Handling Systems (IHSs) may include: one or more processors; a camera; a memory device coupled to the one or more processors, the memory device storing computer-readable instructions that, upon execution by the one or more processors, cause the IHS to: monitor activity by a user of the IHS, wherein the monitoring does not utilize the camera of the IHS; upon initiating the monitoring of activity by the user, initialize a timer measuring the time since the last break by the user; based on the timer and the monitored activity by the user, identify an interval of a first duration with no activity by the user; upon detection of the interval with no activity by the user, reinitialize the timer; based on the timer and the monitored activity by the user, identify an interval of a second duration with uninterrupted operation of the IHS by the user, wherein uninterrupted operation of the IHS by the user comprises monitored activity by the user without identifying the interval of the first duration with no activity by the user; and upon detection of the interval of a second duration with uninterrupted operation of the IHS by the user, present the user with a suggestion to take a break from operation of the IHS.

In some IHS embodiments, the interval of the first duration without activity by the user corresponds to the user taking a break from operation of the IHS. In some IHS embodiments, the interval of the second duration with uninterrupted operation of the IHS by the user corresponds to the user actively operating the IHS without taking a break from operation of the IHS. In some IHS embodiments, the monitored activity by the user of the IHS comprises at least one of keyboard inputs by the user, pointing device inputs by the user, voice command inputs by the user and software application inputs by the user. In some IHS embodiments, execution of the instructions further causes the IHS to: monitor an availability of one or more resources of the IHS; and when availability of the resources drops below a threshold, to suspend monitoring of at least one of the keyboard inputs by the user, pointing device inputs by the user, voice command inputs by the user and software application inputs by the user. In some IHS embodiments, the one or more resources of the IHS that are monitored for availability comprise at least one of a power status of the IHS, a processor load of the IHS, and a memory availability of the IHS. In some IHS embodiments, upon presenting the user with a suggestion to take a break from operation of the IHS, reinitialize the timer and shorten the interval of the second duration. In some IHS embodiments, until the break from operation of the IHS is detected, the interval of the second duration is shortened each time an interval is detected of uninterrupted operation of the IHS by the user. In some IHS embodiments, the suggestion to take the break from operation of the IHS comprises a popup user interface supported by an operating system of the IHS. In some IHS embodiments, a length of the interval of the second duration is selected based on an amount of monitored keyboard inputs by the user. In some IHS embodiments, a length of the interval of the first duration is selected based on a number of detected breaks from operation of the IHS by the user.

In various additional embodiments, methods are provided for detecting and suggesting breaks to a user of an Information Handling System (IHS). The methods may include: monitoring activity by the user of the IHS, wherein the monitoring does not utilize a camera of the IHS; upon initiating the monitoring of activity by the user, initializing a timer measuring the time since the last break by the user; based on the timer and the monitored activity by the user, identifying an interval of a first duration with no activity by the user; upon detection of the interval with no activity by the user, reinitializing the timer; based on the timer and the monitored activity by the user, identifying an interval of a second duration with uninterrupted operation of the IHS by the user, wherein uninterrupted operation of the IHS by the user comprises monitored activity by the user without identifying the interval of the first duration with no activity by the user; and upon detection of the interval of a second duration with uninterrupted operation of the IHS by the user, presenting the user with a suggestion to take a break from operation of the IHS.

In some method embodiments, the interval of the first duration without activity by the user corresponds to the user taking a break from operation of the IHS. In some method embodiments, the interval of the second duration with uninterrupted operation of the IHS by the user corresponds to the user actively operating the IHS without taking a break from operation of the IHS. In some method embodiments, the monitored activity by the user of the IHS comprises at least one of keyboard inputs by the user, pointing device inputs by the user, voice command inputs by the user and software application inputs by the user. In some method embodiments, upon presenting the user with a suggestion to take a break from operation of the IHS, reinitialize the timer and shorten the interval of the second duration.

In various additional embodiments, computer-readable storage devices may include instructions stored thereon detecting and suggesting breaks to a user of an Information Handling System (IHS), wherein execution of the instructions by one or more processors of the IHS causes the one or more processors to: monitor activity by a user of the IHS, wherein the monitoring does not utilize a camera of the IHS; upon initiating the monitoring of activity by the user, initialize a timer measuring the time since the last break by the user; based on the timer and the monitored activity by the user, identify an interval of a first duration with no activity by the user; upon detection of the interval with no activity by the user, reinitialize the timer; based on the timer and the monitored activity by the user, identify an interval of a second duration with uninterrupted operation of the IHS by the user, wherein uninterrupted operation of the IHS by the user comprises monitored activity by the user without identifying the interval of the first duration with no activity by the user; and upon detection of the interval of a second duration with uninterrupted operation of the IHS by the user, present the user with a suggestion to take a break from operation of the IHS.

In some storage device embodiments, the interval of the first duration without activity by the user corresponds to the user taking a break from operation of the IHS. In some storage device embodiments, the interval of the second duration with uninterrupted operation of the IHS by the user corresponds to the user actively operating the IHS without taking a break from this operation of the IHS. In some storage device embodiments, the monitored activity by the user of the IHS comprises at least one of keyboard inputs by the user, pointing device inputs by the user, voice command inputs by the user and software application inputs by the user.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
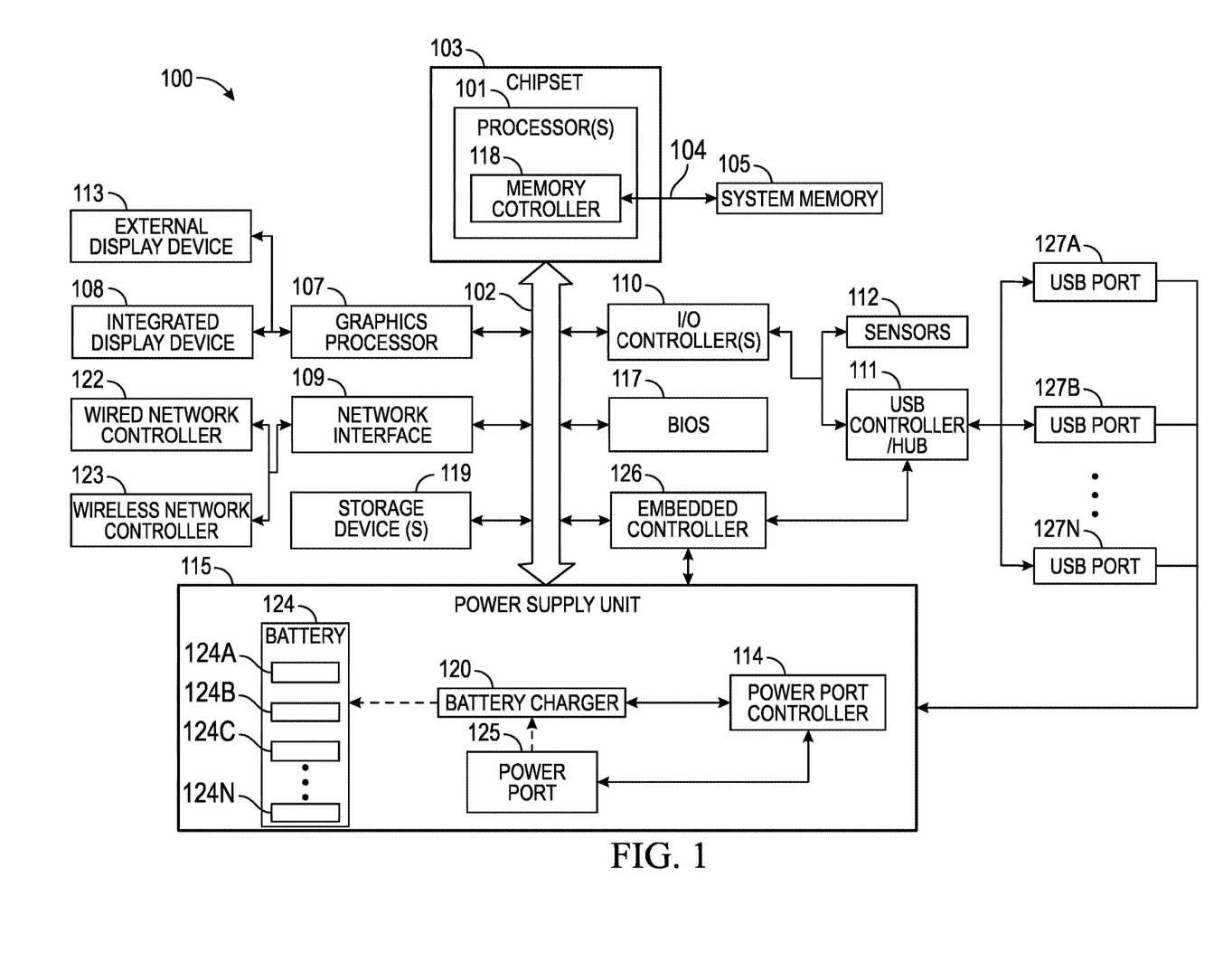
FIG. 1 is a block diagram depicting certain components of an IHS operable according to various embodiments for detecting and suggesting breaks by a user of the IHS.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

FIG. 1 is a block diagram depicting certain components of an IHS 100 operable according to various embodiments for detecting and suggesting breaks by a user of the IHS 100. As described in additional detail below, IHS 100 may include capabilities for determining when a user of IHS 100 is actively using the IHS and when the user is taking a break from using the IHS, where such determinations may be made based on data collected from various I/O capabilities supported by the IHS 100. In addition, if a user of IHS 100 is determined to have been in active and continuous use of the IHS 100 for a prolonged interval, embodiments may suggest breaks to the user. In various embodiments, IHS 100 may include an embedded controller 126 that includes logic that executes program instructions, in conjunction with operations by components of power supply unit 115 and the operating system of IHS 100, to perform the operations disclosed herein for detecting and suggesting breaks by the user of the IHS 100. While a single IHS 100 is illustrated in FIG. 1, IHS 100 may be a component of an enterprise system that may include any number of additional IHSs that may also be configured in the same or similar manner to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connected to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device. In some embodiments, IHS 100 may be a hybrid laptop computer that includes dual integrated displays incorporated in both of the laptop panels. IHS 100 may also support use of one or more external displays 113, such as external monitors that may be coupled to IHS 100 via various types of couplings. In embodiments where display devices 108 and/or 113 are touchscreen displays, inputs by the user to the touchscreen may be monitored for use in determining when the user is actively operating the IHS 100 and when the user is taking a break from using the IHS.

In certain embodiments, chipset 103 may utilize one or more I/O controllers 110 that may each support hardware components such as user I/O devices and sensors 112. For instance, I/O controller 110 may provide access to one or more user I/O devices such as a keyboard, mouse, touchpad, touchscreen, microphone, speakers, camera and other input and output devices that may be coupled to IHS 100. Each of the supported user I/O devices may interface with the I/O controller 110 through wired or wireless connections. In some embodiments, inputs by the user to I/O devices, such as keyboards, pointing devices and microphones, that may be coupled to the IHS 100 via these I/O controllers 110 may be monitored for use in determining when the user is actively operating the IHS 100 and when the user is taking a break from using the IHS.

In certain embodiments, sensors 112 that may be accessed via I/O controllers 110 may provide access to data describing environmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. Various additional sensors, such as optical, infrared and sonar sensors, that may provide support for xR (virtual, augmented, mixed reality) sessions hosted by the IHS 100. Such sensors 112 may capabilities for detecting when a user is detected within a certain proximity to IHS 100. For instance, sensors 112 may detect when a user is in close proximity to the IHS 100 and, in some cases, whether the user is facing the display(s) 108, 113. Sensors 112 may also detect when a user is not in close proximity to the IHS 100, but is nonetheless sufficiently nearby that the user may still be actively using IHS 100, such as by monitoring the progress of an application running on an IHS from across the room. In some embodiments, user proximity determinations based on information collected by sensors 112 may be monitored for use in determining when the user is actively operating the IHS 100 and when the user is taking a break from using the IHS.

As illustrated, I/O controllers 110 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC (System on Chip) of IHS 100, embedded controller 126, processors 101 or of an operating system of IHS 100. USB controller 111 supports communications between IHS 100 and one or more USB devices coupled to IHS 100, whether the USB devices may be coupled to IHS 100 via wired or wireless connections. In some embodiments, a USB controller 111 may operate one or more USB drivers that detect the coupling of USB devices and/or power inputs to USB ports 127a-n. USB controller 111 may include drivers that implement functions for supporting communications between IHS 100 and coupled USB devices, where the USB drivers may support communications according to various USB protocols (e.g., USB 2.0, USB 3.0). In providing functions of a hub, USB controller 111 may support concurrent couplings by multiple USB devices via one or more USB ports 127a-n supported by IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. In some embodiments, BIOS 117 may be implemented using a dedicated microcontroller coupled to the motherboard of IHS 100. In some embodiments, BIOS 117 may be implemented as operations of embedded controller 126. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100.

Embedded controller 126 may also implement operations for interfacing with a power supply unit 115 in managing power for IHS 100. In certain instances, the operations of embedded controller may determine the power status of IHS 100, such as whether IHS 100 is operating strictly from battery power, whether any charging inputs are being received by power supply unit 115, and/or the appropriate mode for charging the one or more battery cells 124a-n using the available charging inputs. Embedded controller 126 may support routing and use of power inputs received via a USB port 127a-n and/or via a power port 125 supported by the power supply unit 115. In addition, operations of embedded controller 126 may interoperate with power supply unit 115 in order to provide battery status information, such as the charge level of the cells 124a-n of battery 124.

In some embodiments, power status information collected by embedded controller 126 may be utilized in determining whether to operate user activity monitoring procedures, where the monitoring of user activity is used to determine when the user is actively operating the IHS 100 and when the user has taken a break from operating the IHS. As described in additional detail below, embodiments may throttle or disable user activity monitoring based on limited power availability, such as reported by embedded controller 126. In some embodiments, embedded controller 126 may provide additional resource constraint information that may be used in throttling or disabling user activity monitoring, where such additional resource availability may include providing the load on processor(s) 101 and system memory 105 availability. Through consideration of resource constraints, embodiments support detecting and suggesting breaks by the user, without contributing to exhaustion of IHS 100 resources.

In some embodiments, embedded controller 126 may also interface with power supply unit 115 in monitoring the battery state of battery 124, such as the relative state of charge of battery 124, where this charge level of the battery 124 may be specified as a percentage of the full charge capacity of the battery 124. In some instance, when operating from power stored in battery system 124, embedded controller 126 may detect when the voltage of the battery system 124 drops below a low-voltage threshold. When the charge level of battery 124 drops below such a low-voltage threshold, embedded controller 126 may transition the IHS to an off-power state in implementing a battery protection mode that preserves a minimal power level in battery 124.

Embedded controller 126 may also implement operations for detecting certain changes to the physical configuration of IHS 100 and managing the modes corresponding to different physical configurations of IHS 100. For instance, where IHS 100 is a laptop computer or a convertible laptop computer, embedded controller 126 may receive inputs from a lid position sensor that may detect whether the two sides of the laptop have been latched together, such that the IHS is in a closed position. In response to lid position sensor detecting latching of the lid of IHS 100, embedded controller 126 may initiate operations for shutting down IHS 100 or placing IHS 100 in a low-power mode. In this manner, IHS 100 may support the use of various power modes. In some embodiments, the power modes of IHS 100 may be implemented through operations of the embedded controller 126 and power supply unit 115.

As described, IHS 100 may also include a power supply unit 115 that receives power inputs used for charging batteries 124 from which the IHS 100 operates. IHS 100 may include a power port 125 to which an AC adapter may be coupled to provide IHS 100 with a supply of DC power. The DC power input received at power port 125 may be utilized by a battery charger 120 for recharging one or more internal batteries 124 of IHS 100. As illustrated, batteries 124 utilized by IHS 100 may include one or more cells 124a-n that may connected in series or in parallel. Power supply unit 115 may support various modes for charging the cells 124a-n of battery 124 based on the power supply available to IHS 100 and based on the charge levels of the battery system 124. In certain embodiments, power supply unit 115 of IHS 100 may include a power port controller 114 that is operable for configuring operations by power port 125.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
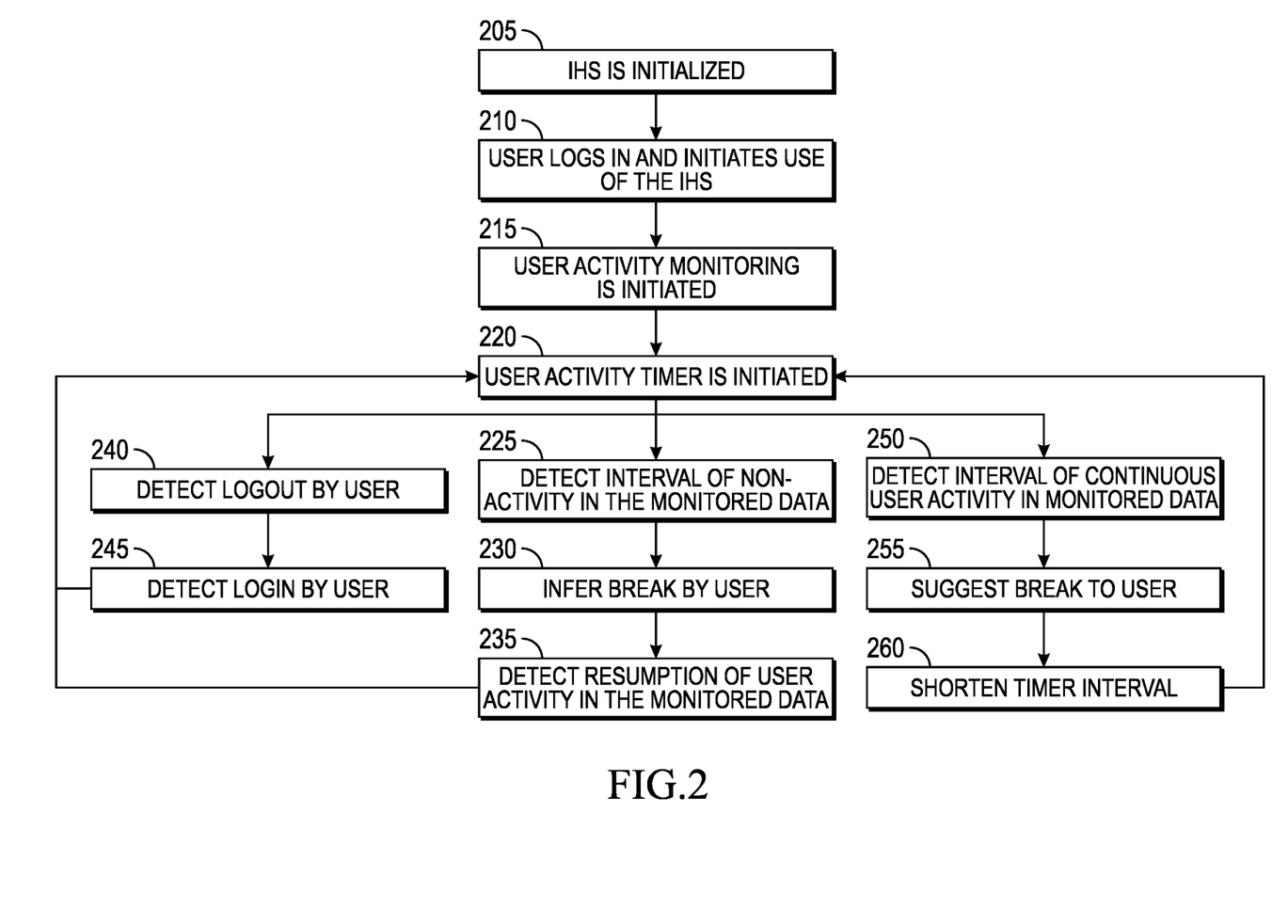
FIG. 2 is a flow chart diagram illustrating certain steps of a process according to various embodiments for detecting and suggesting breaks by a user of an IHS.

FIG. 2 is a flow chart diagram illustrating certain steps of a process according to various embodiments for detecting and suggesting breaks by a user of an IHS. As illustrated, embodiments may begin at block 205 with the initialization of an IHS, such as the IHS described with regard to FIG. 1. Once the IHS has been initialized and the operating system of the IHS is booted, at 210, the user may login to the IHS and/or operating system and may commence operation of the IHS through use of software applications that are supported by the operating system of the IHS.

Upon operation of the IHS being initiated, at 215, one or more user activity monitors may be initiated. As described with regard to FIG. 1, an IHS 100 according to embodiments may be instrumented with capabilities for monitoring activity by the user of the IHS. As described above, embodiments may also monitor availability of resources of the IHS, such as monitoring of the power status, processor load and memory availability for the IHS. Below, the description of FIG. 3 sets forth capabilities by which user activity monitoring may be throttled or disabled in response to detecting different levels of exhaustion of the resources of the IHS.

In monitoring of user activity, I/O controllers of the IHS may be configured to monitor keyboard inputs by the user. Embodiments may monitor for keyboard inputs and track the number of key inputs by the user over time without collecting or recording the specific keys that are depressed by the user, thus detecting when a user is actively engaged in key entry, but without capturing specific keystroke information that could potentially result in a security breach or otherwise violate the user's privacy. In a similar manner, I/O controllers of the IHS may be configured to monitor for pointing device inputs by the user, such as mouse and touchscreen inputs. As with the keyboard inputs, the pointing device inputs may be monitored without capturing the specific pointing device selections made by the user. In some embodiments, an audio controller of the IHS may be configured to monitor for speech inputs by the user, without capturing any of the specific speech inputs by the user. Even though the monitoring application does not track the specific speech inputs by the user, the user activity monitoring may nonetheless interface with speech processing capabilities of the IHS in order to discern actual user speech inputs that are recognized by the IHS from other speech by the user.

In some embodiments, user activity monitoring may include monitoring operation of software applications of the IHS by the user. In such embodiments, the operating system of the IHS may include a user activity monitor that monitors the operation of applications by the user. In some embodiments, user activity monitoring may include monitoring of meeting participation by the user. In some instances, participation may be monitored through APIs supported by a conferencing software application (e.g., Zoom, Webex, Teams) or by the operating system, where such API may provide notifications of the user joining or initiating a meeting and/or notifications about specific actions by the user, such as screen sharing. Monitoring of user activity in meetings may include monitoring of audio inputs to the conferencing application by the user, thus providing an indication of the amount of spoken participation by the user. In some instances, whether user activity is indeed meeting activity may be confirmed based on schedule information, such as meeting details included the user's calendaring system. In some embodiments, user activity during a meeting may be monitored based on detection of user inputs to note-taking applications (e.g., OneNote, Notion, Google Note) during the meeting.

As described, through these user activity monitoring functions, embodiments may track whether the user is actively operating an IHS, without capturing unnecessary information that could compromise the user's privacy. User activity may be monitored without capturing actual keystrokes or voice commands or user interface selections, thus preserving the user's privacy. As such, embodiments support user activity monitoring without use of the camera of the IHS, thus allowing the user to keep the camera in a disabled state or otherwise enable privacy settings that render the camera unusable. By providing user activity monitoring without use of the camera of the IHS, embodiments thus maintain the user's privacy.

With the user activity monitoring initiated, at 220, a timer is initiated for tracking the duration of the user's continuous operation of the IHS without any substantial breaks. Once the timer is initiated, as indicated in FIG. 2, at 225, embodiments detect an interval without user activity in any of the monitored data streams. For instance, embodiments may detect an interval of five minutes without detecting any I/O inputs (i.e., no keyboard, speech or pointing device inputs) and without detecting any user inputs to software applications running in the operating system of the IHS. Due to the lack of user inputs during this interval, embodiments may infer that user has taken a break from operation of the IHS.

Embodiments may configure this interval used as a threshold of non-activity based on various criteria, such the length of time the user has been actively using the IHS over the prior twenty-four hours. For instance, a user that has logged two hours of IHS activity over the prior twenty-four hours may have a two-minute threshold of non-activity for inferring a break by the user, while a user that has logged twelve hours of IHS activity over the prior twenty-four hours may have a five-minute threshold of non-activity for inferring a break. In this manner, relatively short durations of non-activity may suffice for inferred breaks for users with less IHS activity, while users with substantial amounts of activity may require longer thresholds of non-activity before a sufficient break is inferred for that user.

Upon detecting a sufficient interval of non-activity by the user, at 230, a break by the user is inferred. During this interval of non-activity, the activity monitoring capabilities of the IHS continue to monitor for activity by the user. Once activity by the user is detected, at 235, the user is deemed to have resumed active operation of the IHS. In some embodiments, the user is not deemed to have resumed active operation of the IHS until a substantial amount of activity is detected, with minimal inputs, such as a user initiating a streaming music player, not being indicative of a user resuming active operation of the IHS. If the user's inputs are sufficient to indicate a resumption of the user's operation of the IHS, embodiments may return to 220 and may reinitialize the timer used to measure the duration of the user's current session of active operation of the IHS. In some embodiments, the length of the timer duration that is selected may be based on the number of breaks that have been taken and/or inferred by the user over a recent interval. For example, in a scenario where the duration of inactivity used to infer breaks was initially five minutes and the user has logged numerous breaks over the prior six hours, or has taken extended breaks over the past six hours, the timer duration may be shortened to three minutes, while the timer duration may be lengthened to eight minutes for a user that has logged minimal breaks over the prior six hours.

As indicated in FIG. 2, at 240, user breaks may be expressly indicated by the user logging out of the IHS. In such instances, a user may actively log out of the IHS, such as through capabilities provided by the operating system of the IHS. In other instances, a user may be automatically logged out by the operating system of the IHS. At 245, embodiments may detect the user has logged back in to the IHS. In such instances, embodiments may return to 220 and reinitialize the timer use to measure the duration of the user's current session of active operation of the IHS. As above, the timer may be reinitialized for a longer or shorter duration than the prior timer duration, where the timer duration may be selected based on the frequency and/or duration of recent breaks by the user.

As described, in scenarios where a break by the user is detected or inferred, embodiments may resume user activity monitoring. However, in some instances, a user may operate an IHS without taking any substantial breaks for an extended period of time. Accordingly, at 250, based on the monitored streams of user activity data, embodiments may detect continuous user activity by the user for a prolonged duration, such as for sixty minutes. In some embodiments, continuous user activity may be any activity that does not include an inferred break or an explicit break (e.g., user logging out of the operating system) in the user's activity. In some embodiments, the threshold for an interval of continuous use may be a static time duration, such as sixty minutes. In some embodiments, the threshold for an interval of continuous use may be selected based on the total amount of user activity over a recent period, such as over the last twelve hours. In some embodiments, the threshold for an interval of continuous use may be selected based on the amount of user inputs over a recent period, such as the number of key entry and/or voice command inputs over the last six hours, where a shorter threshold of continuous use may be selected during periods of high activity by the user, thus encouraging taking more frequent breaks during intense use of the IHS.

Upon detecting an interval of continuous activity by the user that exceeds a threshold, at 255, a break is suggested to the user. In some embodiments, a break may be suggested through a user interface pop-up dialog supported by the operating system. In some embodiments, a break may be suggested through audible notifications by the IHS. In some embodiments, a break may be suggested through haptic feedback supported by peripherals of the IHS, such as the mouse and/or keyboard. In some embodiments, a break may be suggested through a change to the brightness or color intensity output of the display of the IHS, thus dimming the display of the IHS.

As indicated in FIG. 2, upon suggesting a break to the user, at 260, the duration of the timer is reduced, and the timer is reinitialized as monitoring of user activity continues. By shortening the duration of the timer, a shorter interval of detected continuous user activity IHS will trigger a subsequent suggested break. For instance, upon suggesting a break to the user after detecting an interval of sixty minutes of uninterrupted use of the IHS, the time may be shortened to thirty minutes, such that the subsequent suggestion may be generated by embodiments after detecting thirty minutes of additional, uninterrupted use of the IHS, thus indicating that the user did not take the suggested break. In such a scenario, the timer duration may be halved again, such that the next suggested break may be issued after fifteen more minutes of uninterrupted use of the IHS.

Figure 3:
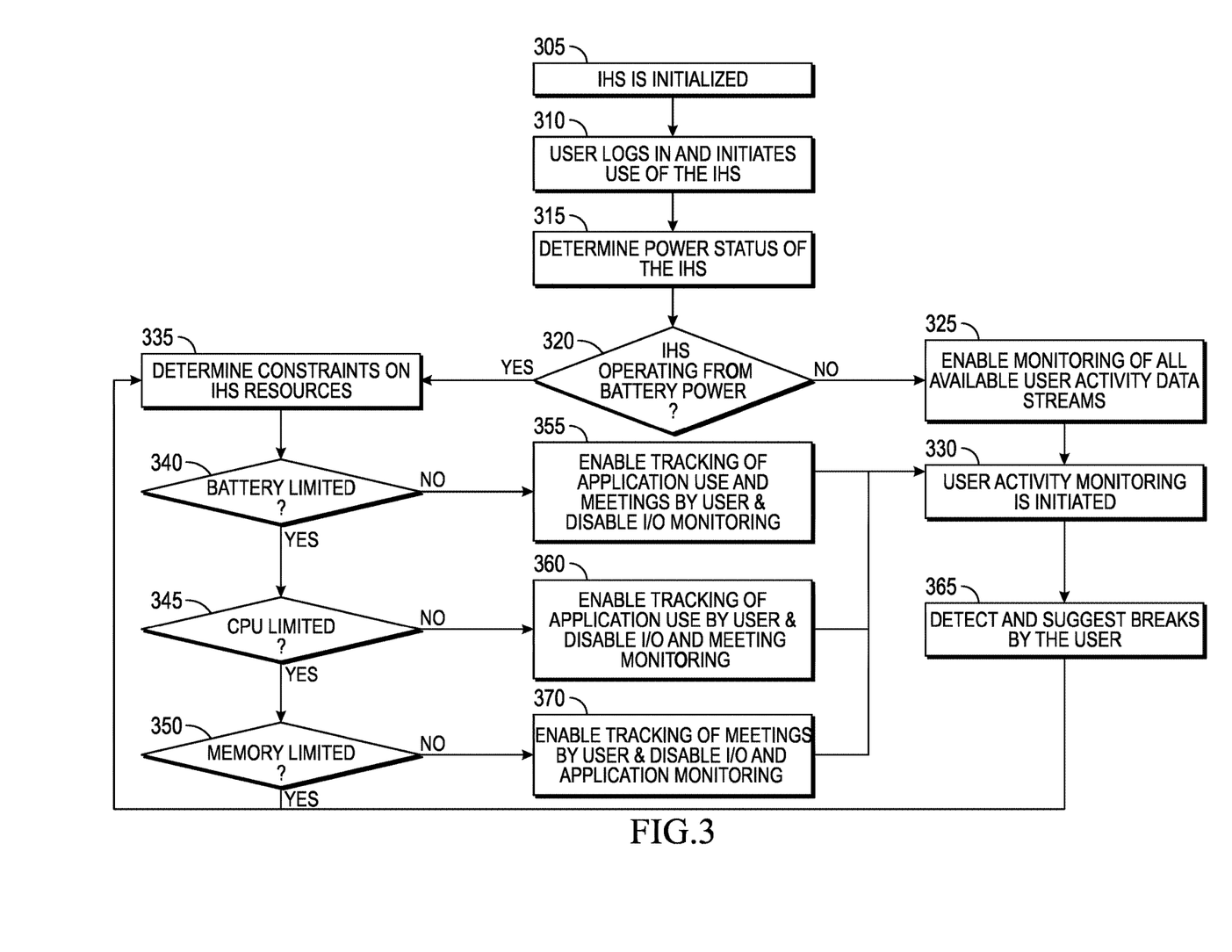
FIG. 3 is a flow chart diagram illustrating certain steps of a process according to various embodiments for detecting and suggesting breaks by a user of an IHS, while accounting for constraints on resources of the IHS.

FIG. 3 is a flow chart diagram illustrating certain steps of a process according to various embodiments for detecting and suggesting breaks by a user of an IHS, while accounting for constraints on resources of the IHS. As with the embodiment of FIG. 2, the embodiment of FIG. 3 may begin at block 305 with the initialization of an IHS, such as the IHS described with regard to FIG. 1. Once the IHS has been initialized and the operating system of the IHS is booted, at 310, the user may login to the IHS and/or operating system and may commence operation of the IHS through use of software applications that are supported by the operating system of the IHS.

As before, upon operation of the IHS being initiated, at 315, one or more user activity monitors may be initiated. As described above, an IHS 100 according to embodiments may be instrumented with capabilities for monitoring activity by the user of the IHS, where such activity monitoring may include tracking inputs by the user to applications operating on the IHS and user inputs detected by I/O devices (e.g., keyboard, pointing device) of the IHS. Also, as described, based on monitored user activity, breaks by the user may be detected and/or suggested. Embodiments may also support capabilities for limiting the types of user activities that are monitored based on the computing resources of the IHS that are available. Detection and suggestion of user breaks provides an important improvement in user wellness, but preferably does not negatively affect the performance of the IHS, or at least not in a manner that contributes to exhaustion of the resources of the IHS. Accordingly, embodiments may restrict the types of user activity monitoring that are utilized based whether there are presently constraints of IHS resources.

In support of these capabilities that limit user activity monitoring based on resource availability, at 315, the power status of the IHS is determined. As described with regard to FIG. 1, an IHS may be a portable system that may operate using stored battery power and/or from power provided from an external source, such as an AC adapter. Embodiments may thus determine whether the IHS is operating from battery power or is operating from an external power source, in some cases through queries supported by an embedded controller of the IHS, such as described with regard to FIG. 1. In particular, at 320, embodiments may determine whether the IHS is operating from battery power. When operating from battery power, an IHS may implement power conservation procedures that are not utilized when the IHS is operating from an external power source.

In scenarios where the IHS is determined to be operating from an external power source, and thus not relying on battery power, at 325, embodiments may enable monitoring of user activity using all available monitoring capabilities, such as those set forth with regard to FIG. 2. For instance, user monitoring may include monitoring of various types of I/O inputs by the user and software application inputs by the user. In scenarios where the IHS is operating from battery power, all available user monitoring capabilities may be employed and, at 330, monitoring of user activity is initiated. As described with regard to FIG. 3, based on such user monitoring, at 365, embodiments may identify durations during which no user activity is detected, thus indicating the user has taken a break from the operation of the IHS, and may also identify intervals during which continuous or regular user activity without lapses are detected. As described, when these intervals of activity are detected, embodiments provide the user with suggestions for a break.

In the embodiment of FIG. 3, the types of user monitoring that are utilized is configured based on the availability of IHS resources. As indicated in FIG. 3, at 320, when embodiments determine the IHS is operating from battery power, at 335, any constraints on the IHS resources are determined. Accordingly, at 340, embodiments determine the degree to which available battery power is presenting a constraint on the operation of the IHS. As described with regard to the IHS of FIG. 1, an IHS according to embodiments may be support various power modes, some of which may be selected based on the available battery power. For instance, an IHS may be configured to support power-saving modes that throttle or disable various functions of the IHS in order to conserve available battery power. In some embodiments, the embedded controller described with regard to the IHS of FIG. 1 may be configured to report battery saving modes and to specify IHS functions, or types of IHS functions, that should be throttled or disabled based on the available battery power. In some embodiments, embodiments may determine whether to throttle or disable user activity monitoring based on power mode information provided by an embedded controller, and/or based on battery information provided by other components of the IHS.

In scenarios, the battery power of the IHS may be sufficient such that no power saving operations are currently being implemented. In such instances, at 355, embodiments may nonetheless throttle certain aspects of the described user activity monitoring. In the illustrated embodiment, user activity monitoring functions that track user I/O inputs may be disabled, while still utilizing functions that track application use and that track meetings by the user. In some instances, tracking a user's I/O inputs may require non-negligible IHS resources and, since this tracking of the user's I/O inputs may be particular to embodiments, no other operation of the IHS would also be using these capabilities. Tracking of application use and of meeting participation may already be utilized by the operating system and/or by a meeting application or service. As such, there may be fewer gains in resource availability by embodiments suspending these particular types of user activity monitoring.

In scenarios where the battery power is constrained, embodiments may continue at 345, by evaluating whether the CPU of the IHS is also constrained, such as whether the load on the CPU is above a threshold level. In scenarios where the battery is constrained, but the CPU is not, at 360, embodiments may further disable user activity monitoring of meeting participation, in addition to the already disabling of I/O user activity monitoring. Embodiments may continue utilizing activity monitoring that is based on tracking of user inputs to software applications since these functions will be provided by the operating system, regardless of whether they are utilized by embodiments. As indicated in FIG. 3, embodiments continue to monitor and suggest breaks to the user based on whatever user activity monitoring data streams that are available.

When the CPU of the IHS is constrained, at 350, embodiments may determine whether the memory of the CPU is also constrained. In some embodiments, memory status information may be provided by the memory controller of the IHS of FIG. 1, where the status information may provide a percentage of the memory that is available for use and/or may provide an indication that memory is constrained and that any memory-saving procedures should be implemented. In scenarios where the memory is not constrained, at 370, embodiments may disable tracking of software application inputs by the user, with the tracking of I/O inputs remaining disabled, and may rely on tracking of meeting participation by the user. In scenarios where the memory is constrained, in addition to the CPU and battery, as indicated in FIG. 3, embodiments continue without initiating any user activity monitoring, with operations reverting, back to 335, to monitoring the constraints on IHS resources. As IHS resources become available, embodiments may re-initiate user activity monitoring, where the specific data streams that are resumed are determined based on the particular resources that have become available.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
   one or more processors;
   a camera;
   a memory device coupled to the one or more processors, the memory device storing computer-readable instructions that, upon execution by the one or more processors, cause the IHS to:
   monitor activity by a user of the IHS, wherein the monitoring does not utilize the camera of the IHS;
   upon initiating the monitoring of activity by the user, initialize a timer measuring the time since the last break by the user;

based on the timer and the monitored activity by the user, identify an interval of a first duration with no activity by the user;

upon detection of the interval with no activity by the user, reinitialize the timer;

based on the timer and the monitored activity by the user, identify an interval of a second duration with uninterrupted operation of the IHS by the user, wherein uninterrupted operation of the IHS by the user comprises monitored activity by the user without identifying the interval of the first duration with no activity by the user; and upon detection of the interval of a second duration with uninterrupted operation of the IHS by the user, present the user with a suggestion to take a break from operation of the IHS.

2. The IHS of claim 1, wherein the interval of the first duration without activity by the user corresponds to the user taking a break from operation of the IHS.

3. The IHS of claim 2, wherein the interval of the second duration with uninterrupted operation of the IHS by the user corresponds to the user actively operating the IHS without taking a break from operation of the IHS.

4. The IHS of claim 3, wherein, upon presenting the user with a suggestion to take a break from operation of the IHS, reinitialize the timer and shorten the interval of the second duration.

5. The IHS of claim 4, wherein, until the break from operation of the IHS is detected, the interval of the second duration is shortened each time an interval is detected of uninterrupted operation of the IHS by the user.

6. The IHS of claim 1, wherein the monitored activity by the user of the IHS comprises at least one of keyboard inputs by the user, pointing device inputs by the user, voice command inputs by the user and software application inputs by the user.

7. The IHS of claim 6, wherein execution of the instructions further causes the IHS to:

monitor an availability of one or more resources of the IHS; and when availability of the resources drops below a threshold, to suspend monitoring of at least one of the keyboard inputs by the user, pointing device inputs by the user, voice command inputs by the user and software application inputs by the user.

8. The IHS of claim 6, wherein the one or more resources of the IHS that are monitored for availability comprise at least one of a power status of the IHS, a processor load of the IHS, and a memory availability of the IHS.

9. The IHS of claim 1, wherein the suggestion to take the break from operation of the IHS comprises a popup user interface supported by an operating system of the IHS.

10. The IHS of claim 1, wherein a length of the interval of the second duration is selected based on an amount of monitored keyboard inputs by the user.

11. The IHS of claim 1, wherein a length of the interval of the first duration is selected based on a number of detected breaks from operation of the IHS by the user.

12. A method for detecting and suggesting breaks to a user of an Information Handling System (IHS), the method comprising:

monitoring activity by the user of the IHS, wherein the monitoring does not utilize a camera of the IHS;

upon initiating the monitoring of activity by the user, initializing a timer measuring the time since the last break by the user;

based on the timer and the monitored activity by the user, identifying an interval of a first duration with no activity by the user;

upon detection of the interval with no activity by the user, reinitializing the timer;

based on the timer and the monitored activity by the user, identifying an interval of a second duration with uninterrupted operation of the IHS by the user, wherein uninterrupted operation of the IHS by the user comprises monitored activity by the user without identifying the interval of the first duration with no activity by the user; and upon detection of the interval of a second duration with uninterrupted operation of the IHS by the user, presenting the user with a suggestion to take a break from operation of the IHS.

13. The method of claim 12, wherein the interval of the first duration without activity by the user corresponds to the user taking a break from operation of the IHS.

14. The method of claim 13, wherein the interval of the second duration with uninterrupted operation of the IHS by the user corresponds to the user actively operating the IHS without taking a break from operation of the IHS.

15. The method of claim 12, wherein the monitored activity by the user of the IHS comprises at least one of keyboard inputs by the user, pointing device inputs by the user, voice command inputs by the user and software application inputs by the user.

16. The method of claim 12, wherein, upon presenting the user with a suggestion to take a break from operation of the IHS, reinitialize the timer and shorten the interval of the second duration.

17. A computer-readable storage device having instructions stored thereon detecting and suggesting breaks to a user of an Information Handling System (IHS), wherein execution of the instructions by one or more processors of the IHS causes the one or more processors to:

monitor activity by a user of the IHS, wherein the monitoring does not utilize a camera of the IHS;

upon initiating the monitoring of activity by the user, initialize a timer measuring the time since the last break by the user;

based on the timer and the monitored activity by the user, identify an interval of a first duration with no activity by the user;

upon detection of the interval with no activity by the user, reinitialize the timer;

based on the timer and the monitored activity by the user, identify an interval of a second duration with uninterrupted operation of the IHS by the user, wherein uninterrupted operation of the IHS by the user comprises monitored activity by the user without identifying the interval of the first duration with no activity by the user; and upon detection of the interval of a second duration with uninterrupted operation of the IHS by the user, present the user with a suggestion to take a break from operation of the IHS.

18. The computer-readable storage device of claim 17, wherein the interval of the first duration without activity by the user corresponds to the user taking a break from operation of the IHS.

19. The computer-readable storage device of claim 17, wherein the interval of the second duration with uninterrupted operation of the IHS by the user corresponds to the user actively operating the IHS without taking a break from this operation of the IHS.

20. The computer-readable storage device of claim 17, wherein the monitored activity by the user of the IHS comprises at least one of keyboard inputs by the user, pointing device inputs by the user, voice command inputs by the user and software application inputs by the user.

\* \* \* \* \*